United States Patent
Long et al.

(10) Patent No.: US 9,830,007 B2
(45) Date of Patent: Nov. 28, 2017

(54) TOUCH NAKED-EYE 3D GRATING AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jun Long, Beijing (CN); Junguo Liu, Beijing (CN); Hongkun Zhang, Beijing (CN); Rui Li, Beijing (CN)

(73) Assignees: BEIJING BOE OPTOELECTRONICS TECHNOLOGY CO., LTD., Beijing (CN); BOE TECHNOLOGY GROUP CO., LTD., Bejing (CN)

( * ) Notice: Subject to any disclaimer, the term of this patent is extended or adjusted under 35 U.S.C. 154(b) by 61 days.

(21) Appl. No.: 14/348,169

(22) PCT Filed: Aug. 26, 2013

(86) PCT No.: PCT/CN2013/082296
§ 371 (c)(1),
(2) Date: Mar. 28, 2014

(87) PCT Pub. No.: WO2014/187041
PCT Pub. Date: Nov. 27, 2014

(65) Prior Publication Data
US 2015/0138136 A1    May 21, 2015

(30) Foreign Application Priority Data
May 24, 2013 (CN) .......................... 2013 1 0199291

(51) Int. Cl.
*G06F 3/041* (2006.01)
*G02B 27/26* (2006.01)
(Continued)

(52) U.S. Cl.
CPC ....... *G06F 3/0412* (2013.01); *G02B 27/2214* (2013.01); *G02B 27/26* (2013.01); *G06F 3/044* (2013.01); *G06F 2203/04103* (2013.01)

(58) Field of Classification Search
CPC .................. G06F 3/0412; G06F 3/044; G06F 2203/04103; G02B 27/2214; G02B 27/26
(Continued)

(56) References Cited

U.S. PATENT DOCUMENTS

2007/0216637 A1* 9/2007 Ito .......................... G06F 3/0412
345/102
2009/0050376 A1* 2/2009 Jeon ...................... G06F 3/0416
178/18.03
(Continued)

FOREIGN PATENT DOCUMENTS

CN          2927175 Y       7/2007
CN       101976139 A        2/2011
(Continued)

OTHER PUBLICATIONS

Machine translation of CN 202854758 U, Hsu J et al.*
(Continued)

*Primary Examiner* — Stephen Sherman
(74) *Attorney, Agent, or Firm* — Ladas & Parry LLP

(57) ABSTRACT

A touch naked-eye 3D grating and a display device are disclosed. The naked-eye 3D grating includes a touch electrode structure between the upper substrate and the plate electrode, and the touch electrode structure includes a plurality of first touch sense lines and a plurality of second touch sense lines arranged to intersect with and insulated from each other, and includes touch electrodes located within the areas defined by adjacent two first touch sense lines and adjacent two second touch sense lines; each touch electrode creates a capacitor with the plate electrode so as to
(Continued)

achieve the touch function by way of detecting the signal changes over the first touch sense line and the second touch sense line connected with the touch electrode. The display device includes the aforesaid touch naked-eye 3D grating. This touch naked-eye 3D grating simplifies the assembly configuration as well as its production process, thus reducing overall cost for manufacturing the assembly.

18 Claims, 3 Drawing Sheets

(51) Int. Cl.
  *G06F 3/044* (2006.01)
  *G02B 27/22* (2006.01)
(58) Field of Classification Search
  USPC .................................. 345/174; 178/18.06
  See application file for complete search history.

(56) References Cited

U.S. PATENT DOCUMENTS

| | | | |
|---|---|---|---|
| 2011/0109622 A1* | 5/2011 | Son et al. | 345/419 |
| 2012/0242612 A1 | 9/2012 | Chang | |
| 2012/0242615 A1* | 9/2012 | Teraguchi et al. | 345/174 |
| 2013/0148043 A1* | 6/2013 | Ohyama | 349/15 |
| 2013/0154977 A1* | 6/2013 | Lee et al. | 345/173 |
| 2013/0215076 A1* | 8/2013 | Lee et al. | 345/174 |
| 2013/0285973 A1* | 10/2013 | Elias | G06F 3/044 345/174 |
| 2013/0335463 A1* | 12/2013 | Chiang et al. | 345/697 |
| 2014/0028932 A1* | 1/2014 | Kuo et al. | 349/15 |
| 2014/0198268 A1* | 7/2014 | Sugita | G06F 3/044 349/12 |
| 2014/0292712 A1* | 10/2014 | Koito et al. | 345/174 |

FOREIGN PATENT DOCUMENTS

| | | | |
|---|---|---|---|
| CN | 202142042 U | | 2/2012 |
| CN | 102629011 A | | 8/2012 |
| CN | 202735996 U | | 2/2013 |
| CN | 103049148 A | | 4/2013 |
| CN | 202854758 U | * | 4/2013 |

OTHER PUBLICATIONS

International Search Report dated Jun. 3, 2014; PCT/CN2013/082296.
First Chinese Office Action Appln. No. 201310199291.7; dated Apr. 3, 2015.
Second Chinese Office Action Appln. No. 201310199291.7; dated Sep. 18, 2015.
International Preliminary Report on Patentability dated Nov. 24, 2015; PCT/CN2013/082296.

* cited by examiner

TOUCH NAKED-EYE 3D GRATING AND DISPLAY DEVICE

TECHNICAL FIELD

Embodiments of the present invention relates to a touch naked-eye 3D grating and a display device.

BACKGROUND

As the liquid crystal display technologies continue to advance, the three-dimensional (3D) display technology has obtained significant attention. One basic principle of three-dimensional display technologies is that left and right human eyes receive different pictures, then the human brain overlays the image information from these different pictures, and reconstruct to obtain a vision of three-dimensional effect.

A layer of naked-eye 3D grating may be added onto a display in order to achieve three-dimensional display. Based on implementation manners, generally naked-eye 3D gratings are classified into column lens grating and slit grating, both of which can be realized using liquid crystal gratings. For example, the liquid crystal grating as illustrated in FIG. 1 is generally composed of an upper polarizer sheet 1, a lower polarizer sheet 2, an upper substrate 3, a lower substrate 4, and a liquid crystal layer 5 arranged between the two substrates. The upper substrate 3 and the lower substrate 4 comprise a plate electrode 6 and strip electrodes 7 respectively, and the plurality of electrode strips of the strip electrodes 7 are arranged parallel to each other. The working principle for this liquid crystal grating is described as follows.

When potential difference is present between the strip electrodes 7 and the plate electrode 6 and thus an electric field is generated, the liquid crystal molecules corresponding to the strip electrodes 7 are subjected to rotation, while other liquid crystal molecules keep original shapes without any rotation. At this point, light enters through the lower polarizer sheet 2, and then polarized light parallel to the transmission axle of the lower polarizer sheet 2 enters the liquid crystal layer 5. The vibration direction of the polarized light varies gradually when passing though the rotated liquid crystal molecules, and upon reaching the upper polarizing plate 1, the vibration direction of the polarized light becomes inconsistent with the transmission axle of the upper polarizing plate 1, such that the light with changed vibration direction can not pass through the upper polarizing plate 1, and therefore dark strips are thereby formed in the zones corresponding to the strip electrodes. In contrast, the vibration direction of the polarized light does not vary when passing though non-rotated liquid crystal molecules, and upon reaching the upper polarizing plate 1, the vibration direction of the polarized light is consistent with the transmission axle of the upper polarizing plate 1, such that the light with unchanged vibration direction can pass through the upper polarizing plate 1, bright strips are thereby formed in the zones corresponding to parts other than the strip electrodes. In this way, a parallax grating in an extending direction along the length of the strip electrodes is formed, thus achieving a grating three-dimensional display mode. In a 3D mode, the parallax grating is controlled to allow that the light emitted from the pixels corresponding to left eye pictures can only enter a left eye while the light emitted from the pixels corresponding to right eye pictures can only enter a right eye, which makes it possible for the left and right eyes to catch pictures different from each other and thus achieves a three-dimensional display effect.

Along with growth of the touch display technologies recently, there appears a 3D display device incorporating a touch screen and a three-dimensional display, and the configuration thereof is to further add a layer of touch substrate on a three-dimensional display screen. However, such a configuration and its production processes are relatively complex, and increase overall costs for manufacturing modules, and at the same time, the thickness of the display is increased greatly since an additional layer for the touch substrate become necessary.

SUMMARY

Embodiments of the present invention provide a touch naked-eye 3D grating and a display device, and the configuration of such a touch naked-eye 3D grating is relatively simple and is capable of achieving touch function and three-dimensional display function simultaneously.

An embodiment of the present invention provides a touch naked-eye 3D grating, comprising an upper substrate, a lower substrate located oppositely to the upper substrate, strip electrodes arranged at a side of the lower substrate facing the upper substrate, and a plate electrode arranged at a side of the upper substrate facing the lower substrate, a touch electrode structure located between the upper substrate and the plate electrode, and the touch electrode structure and the plate electrode are insulated from each other. The touch electrode structure particularly comprises a plurality of first touch sense lines and a plurality of second touch sense lines arranged to intersect with and insulated from each other, and a touch electrode arranged within an area defined between adjacent two first touch sense lines and adjacent two second touch sense lines; and each of the touch electrodes is electrically connected to adjacent one first touch sense line as well as adjacent one second touch sense line, respectively.

An embodiment of the present invention also provides a display device comprising a display panel and a touch naked-eye 3D grating located at an emitting side of the display panel, and the touch naked-eye 3D grating is above touch naked-eye 3D grating provided by the embodiment of the present invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

To make clearer the aim, technical solutions and advantages of the embodiments of the present invention, a clear and complete description about the technical solution of the embodiment of the present invention will be made with reference to the accompanying drawings of the embodiments of the present invention. Obviously, the described embodiments are merely part of the embodiments of the present invention, but not all the embodiments. Based on described embodiments of the present invention, all other embodiments, obtained by the skilled in this art without any creative works, fall into protective scope of the present invention.

Unless otherwise defined, the technical or scientific terms being used should take the meaning usually understood by the ordinary skilled in this art of the present invention. In the patent application specification and the claims of the present invention, the wording "a", "an", "the" and the like words does not mean quantitative restriction, but means the presence of at least one. Wording such as "including", "comprising" and the like means that element elements or articles before this word encompass the elements or articles and their equivalents listed after this word, instead of excluding other elements or articles. "Connected", "coupled with" and the like are not limited to physical or mechanical connections, but may comprise electrical connection, no matter directly or indirectly. "On", "under", "left", "right" and the like are only used for representing a relative positional relationship, and when the described object has changed its absolute position, this relative positional relationship positional relationship may also vary accordingly.

The thickness and dimensions of each layer of film throughout the drawings do not reflect actual scale of the naked-eye 3D grating, but only are intended to schematically illustrate the content of the embodiment of the present invention.

Figure 1:
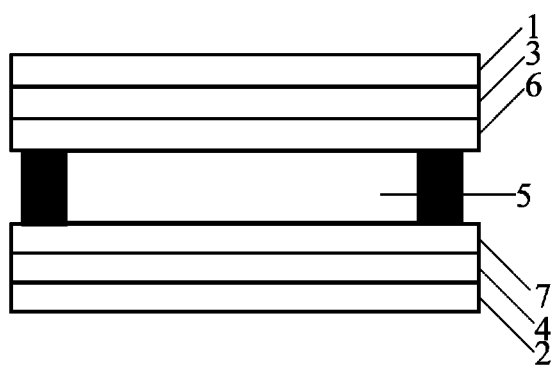
FIG. 1 is a structural representation of the liquid crystal grating in conventional art.
Figure 2:
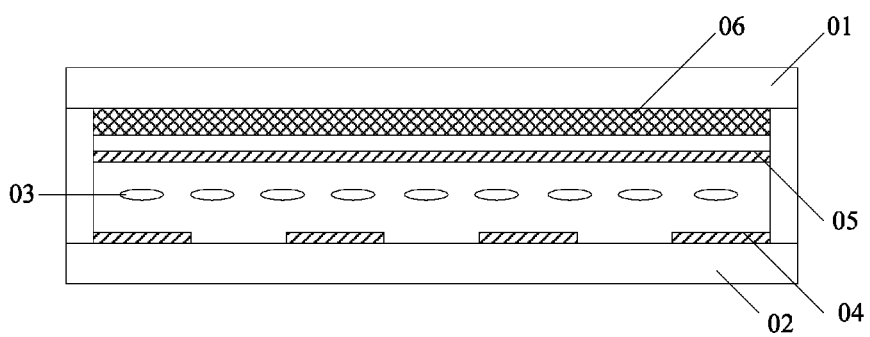
FIG. 2 is a structural representation of the touch naked-eye 3D grating provided by an embodiment of the present invention.

An embodiment of the present invention provides a touch naked-eye 3D grating, as illustrated in FIG. 2, comprising an upper substrate 01, a lower substrate 02 arranged oppositely to the upper substrate 01, strip electrodes 04 arranged at a side of the lower substrate 02 facing the upper substrate 01, and a plate electrode 05 arranged at a side of the upper substrate 01 facing the lower substrate 02. The strip electrodes 04 comprise a plurality of electrode strips spaced in a certain interval (slit) and parallel with each other, and FIG. 2 shows a schematic section view of these electrode strips.

The touch naked-eye 3D grating further comprises a touch electrode structure 06 provided between the upper substrate 01 and the plate electrode 05, and the touch electrode structure 06 and the plate electrode 05 are insulated from each other.

Figure 3:
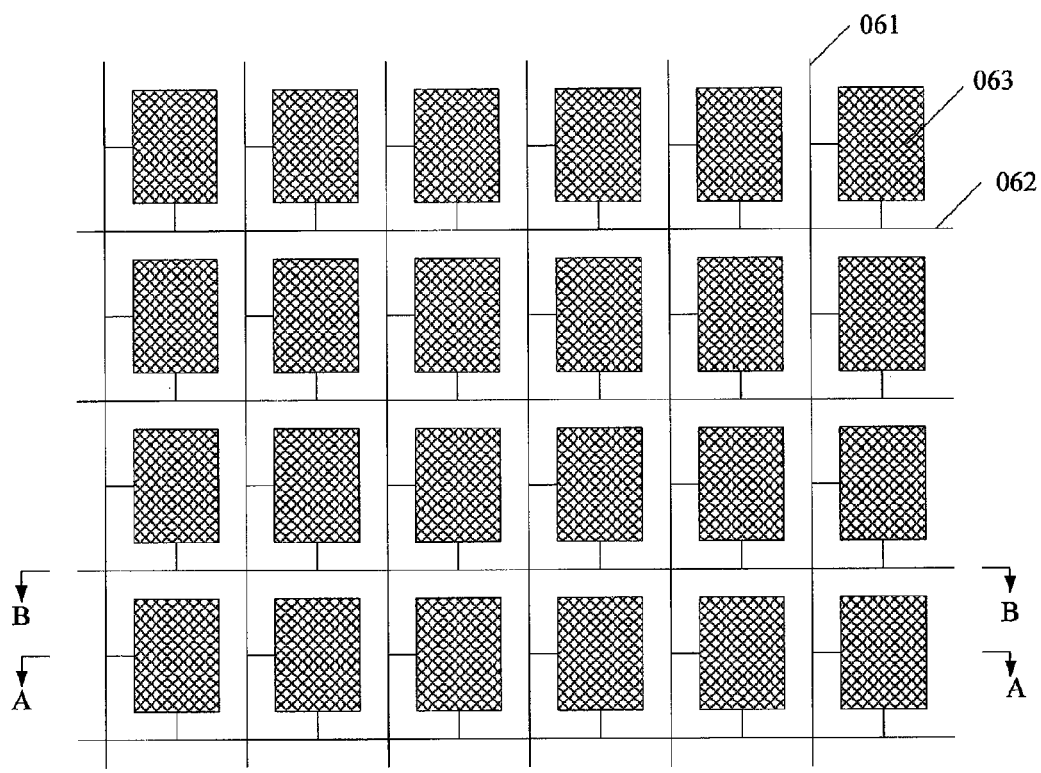
FIG. 3 is a structural representation of the touch electrode structure in the touch naked-eye 3D grating provided by an embodiment of the present invention.

One example of the touch electrode structure 06, as illustrated in FIG. 3, comprises a plurality of first touch sense lines 061, a plurality of second touch sense lines 062, and a touch electrode 063 arranged within an area defined between adjacent two first touch sense lines 061 and adjacent two second touch sense lines 062, and the first and second touch sense lines are arranged to intersect with and insulated from each other. Each of the touch electrodes 063 is electrically connected to adjacent one first touch sense line 061 as well as adjacent one second touch sense line 062, respectively.

The above-described naked-eye 3D grating provided in the present embodiment may be a slit grating or may be a column lens grating, and the both kinds of gratings may be achieved with liquid crystal gratings. The following description is made taking a liquid crystal grating as an example, i.e., as illustrated in FIG. 2, the description is made based on such an example in which a liquid crystal layer 03 is provided between the upper substrate 01 and the lower substrate 02. Absolutely, the embodiments of the present invention are also available for the gratings made from an electrochromic material or the like material, and detailed explanation thereof is omitted here.

The above naked-eye 3D grating provided in the present embodiment may be obtained by adding the touch electrode structure 06 insulated from the plate electrode 05 in a conventional naked-eye 3D grating. Each touch electrode 063 in the touch electrode structure 06 creates a capacitor with the plate electrode 05. When a finger touches the naked-eye 3D grating or moves on the surface of the naked-eye 3D grating, the finger and a touch electrode 063 also forms a capacitor and such a capacitor can cause a quantity variation of electric charges of the touch electrode 063. It's thus possible to determine the position of the touching point(s) so as to achieve touch function by detecting signal changes on the first touch sense lines 061 and the second touch sense lines 062 electrically connected with the touch electrode. Compared with the configuration by adding a layer of touch substrate onto a three-dimensional display, the naked-eye 3D grating provided by this embodiment only need to incorporate a touch electrode structure in the upper substrate, thus simplifying the assembly configuration as well as its production process, and further reducing the overall costs for manufacturing the assembly while decreasing the thickness of the display.

Furthermore, in the naked-eye 3D grating provided in this embodiment, there always provides uniform slits between the strip electrodes 04. When a voltage is applied to the strip electrodes 04 and the plate electrode 05 respectively, and potential difference and thus electric field are caused therebetween, the liquid crystal molecule in the liquid crystal layer 03 corresponding the strip electrodes 04 (for example, immediately above the strip electrode 04 in FIG. 2) are subjected to rotation, while other liquid crystal molecules corresponding to the slits keep their original shapes without any rotation. In the zones corresponding to the strip electrodes 04, dark strips are formed, while in the zones corresponding to parts other than the strip electrodes, bright strips are created, and in this way, a parallax grating in an extending direction along the length of the strip electrode 04 is obtained. The parallax grating can be controlled so that the light emitted from the pixels corresponding to left eye pictures can only enter a left eye while the light emitted from the pixels corresponding to right eye pictures can only enter a right eye, which makes it possible for the left and right eyes to catch pictures different from each other and thus achieves a three-dimensional display effect.

Detailed explanation about the touch electrode structure in above naked-eye 3D grating provided in the embodiment will be made in the following.

Preferably, for example, the extending directions of the first touch sense lines 061 and the second touch sense lines 062 in the touch electrode structure 06 are vertical to each other, and both wires 061 and 062 are insulated from each other. In the configuration as illustrated in FIG. 3, for example, the first touch sense lines 061 extend in the vertical direction, and the second touch sense lines 062 extend in the horizontal direction. In the case where the quantity variation of electric charges on the touch electrode 063 occurs, it's possible to determine the X-axis coordinate of the touching point by detecting signal changes on the first touch sense lines 061, and determine the Y-axis coordinate of the touching point by detecting signal changes on the second touch sense lines 062, thereby positioning the location of the touching point.

Preferably, in order to guarantee homogeneity of touch accuracy over the entire naked-eye 3D grating, it's generally necessary to provide an identical interval between any adjacent two first touch sense lines 061, and an identical interval between any adjacent two second touch sense lines 062 as well.

The connection relationship between the first touch sense lines 061 and the second touch sense lines 062 with each of the touch electrodes 063 may be a relationship of one-to-one correspondence, as illustrated in FIG. 3, that is to say, one touch electrode 063 is electrically connected with one adjacent first touch sense line 061 and one adjacent second touch sense line 062. In this way, during touch occurs at a touch electrode 063, signal changes only occurs on the one first touch sense line 061 and the one second touch sense line 062 connected with the touch electrode, which makes it possible to determine the position of the touching point accurately.

Figure 4:
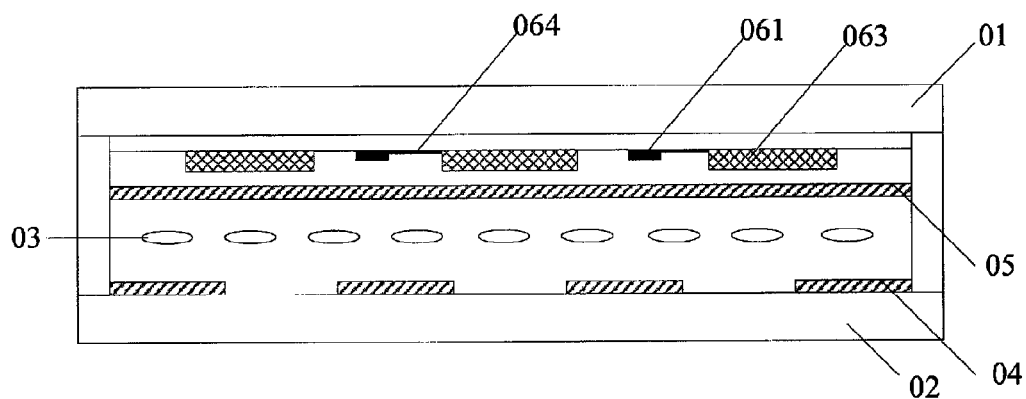
FIG. 4 is a schematic cross section along the line A-A in FIG. 3.

For example, each of the first touch sense lines 061 and each of the second touch sense lines 062 may be directly electrically connected with the corresponding touch electrode 063, and as illustrated in FIG. 4, may also connected with the corresponding touch electrode 063 through a wire 064, while no limitation is made herein.

Figure 5:
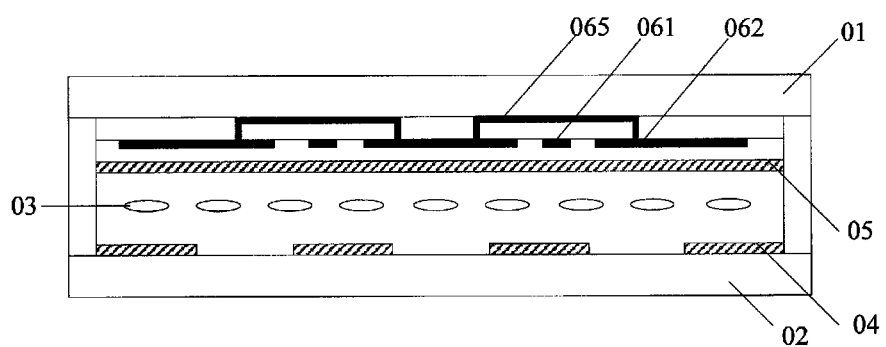
FIG. 5 is a schematic cross section along the line B-B in FIG. 3.

For example, the first touch sense lines 061 and the second touch sense lines 062 in the touch electrode structure 06 may be arranged in a same layer, and bridging structures are used at the crossover locations between the wires 061 and 062 so as to guarantee mutual insulation therebetween. More specifically, a bridging structure may be arranged at the crossover location of one first touch sense line 061 with one second touch sense line 062, or a bridging structure 065 may be arranged at the crossover location of one second touch sense line 062 with one first touch sense line 061, as illustrated in FIG. 5, no limitation is made herein. For example, the first touch sense lines 061 and the second touch sense lines 062 in the touch electrode structure 06 may also be provided in different layers and insulated from each other.

In the case where the first touch sense lines 061 and the second touch sense lines 062 are arranged in a same layer, each first touch sense line 061 and each second touch sense line 062 may be arranged between the touch electrodes 063 and the plate electrode 05, and it's also possible for each first touch sense line 061 and each second touch sense line 062 to be arranged between the touch electrodes 063 and the upper substrate 01, no limitation is made herein.

Or, the first touch sense lines 061 and the second touch sense lines 062 in the touch electrode structure 06 may be arranged at either side of the touch electrodes 063, for example. For example, each first touch sense line 061 may be provided between the touch electrodes 063 and the plate electrode 05, and each second touch sense line 062 may be provided between the touch electrodes 063 and the upper substrate 01; or each first touch sense line 061 may be provided between the touch electrodes 063 and the upper substrate 01, and each second touch sense line 062 may be provided between the touch electrodes 063 and the plate electrode 05, no limitation is made herein.

Figure 6:
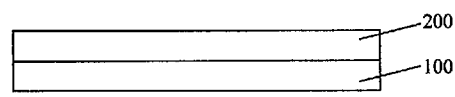
FIG. 6 is a schematic view of the display device according to an embodiment of the present invention.

From an identical inventive concept, an embodiment of the present invention also provides a display device, as illustrated in FIG. 6, comprising a display panel 100 and a touch naked-eye 3D grating 200 located at the emitting side of the display panel, the touch naked-eye 3D grating is any of the above-described touch naked-eye 3D gratings provided by embodiments of the present invention. Implementation of this display device may refer to above embodiments of the touch naked-eye 3D gratings, and repeated description is omitted here.

For example, the display panel of this display device may be a liquid crystal display (LCD) panel, an organic light emitting display (OLED) panel, a plasma display panel (PDP), a cathode-ray tube (CRT) display or the like, and no restrictions are made herein.

The embodiment of the present invention provides a touch naked-eye 3D grating and a display device, in which a touch electrode structure is added within the naked-eye 3D grating between the upper substrate and the plate electrode; the touch electrode structure comprises a plurality of first touch sense lines and a plurality of second touch sense lines arranged to intersect with and insulated from each other, and a touch electrode arranged within an zone defined between adjacent two first touch sense lines and adjacent two second touch sense lines, and each touch electrode and the plate electrode creates a capacitor. When touch occurs, the electric field of human body causes quantity variation of electricity on the touch electrode; and by detecting signal changes on the first touch sense line and the second touch sense line electrically connected with the touch electrode, the touch function is achieved. With respect to the configuration of adding a layer of touch substrate on a three-dimensional display, the embodiment of the present invention only need to add a touch electrode structure in the upper substrate, thus simplifying the assembly configuration as well as its production process, and further reducing the overall costs for manufacturing the assembly while decreasing the thickness of the display.

What are described above is related to the illustrative embodiments of the disclosure only and not limitative to the scope of the disclosure; the scopes of the disclosure are defined by the accompanying claims.

The invention claimed is:

1. A touch naked-eye 3D grating, comprising an upper substrate, a lower substrate located oppositely to the upper substrate, strip electrodes arranged at a side of the lower substrate facing the upper substrate, and a plate electrode arranged at a side of the upper substrate facing the lower substrate; and a touch electrode structure located between the upper substrate and the plate electrode, the touch electrode structure and the plate electrode being insulated from each other, wherein:

the touch electrode structure comprises a plurality of first touch sense lines, a plurality of second touch sense lines, and a touch electrode arranged within an area defined between adjacent two first touch sense lines and adjacent two second touch sense lines;

the plurality of first touch sense lines is arranged to extend across the plurality of second touch sense lines and is insulated from the plurality of second touch sense lines; and for each of the touch electrodes:

the touch electrode is electrically connected to a corresponding adjacent first touch sense line via a first conductive wire to produce and output a first signal change on the corresponding adjacent first touch sense line when a quantity of electric charges of the touch electrode varies;

the touch electrode is also electrically connected to a corresponding adjacent second touch sense line via a second conductive wire to produce and output a second signal change on the corresponding adjacent second touch sense line when the quantity of electric charges of the touch electrode varies; and the first signal change outputted on the corresponding adjacent first touch sense line and the second signal change outputted on the corresponding adjacent second touch sense line are caused by variation of the quantity of electric charges of the same touch electrode.

2. The touch naked-eye 3D grating according to claim 1, wherein extending directions of the first touch sense line and the second touch sense line are orthogonal with each other.

3. The touch naked-eye 3D grating according to claim 2, wherein intervals between any adjacent two first touch sense lines are identical; and intervals between any adjacent two second touch sense lines are identical.

4. The touch naked-eye 3D grating according to claim 2, wherein:
each of the first touch sense lines comprises a bridging structure at a crossover location thereof with each of the second touch sense lines; or each of the second touch sense lines comprises a bridging structure at a crossover location thereof with each of the first touch sense lines.

5. The touch naked-eye 3D grating according to claim 1, wherein intervals between any adjacent two first touch sense lines are identical; and intervals between any adjacent two second touch sense lines are identical.

6. The touch naked-eye 3D grating according to claim 5, wherein:
each of the first touch sense lines comprises a bridging structure at a crossover location thereof with each of the second touch sense lines; or each of the second touch sense lines comprises a bridging structure at a crossover location thereof with each of the first touch sense lines.

7. The touch naked-eye 3D grating according to claim 1, wherein:
each of the first touch sense lines comprises a bridging structure at a crossover location thereof with each of the second touch sense lines; or each of the second touch sense lines comprises a bridging structure at a crossover location thereof with each of the first touch sense lines.

8. The touch naked-eye 3D grating according to claim 7, wherein each of the first touch sense lines and each of the second touch sense lines are located between the touch electrode and the upper substrate, or between the touch electrode and the plate electrode.

9. The touch naked-eye 3D grating according to claim 8, wherein the touch naked-eye 3D grating is a slit grating or a column lens grating.

10. The touch naked-eye 3D grating according to claim 7, wherein the touch naked-eye 3D grating is a slit grating or a column lens grating.

11. The touch naked-eye 3D grating according to claim 1, wherein each of the first touch sense lines is located between the touch electrode and the plate electrode, and each of the second touch sense lines is located between the touch electrode and the upper substrate; or
each of the first touch sense lines is located between the touch electrode and the upper substrate, and each of the second touch sense lines is located between the touch electrode and the plate electrode.

12. The touch naked-eye 3D grating according to claim 11, wherein the touch naked-eye 3D grating is a slit grating or a column lens grating.

13. The touch naked-eye 3D grating according to claim 1, wherein the touch naked-eye 3D grating is a slit grating or a column lens grating.

14. A display device comprising:
a display panel; and
the touch naked-eye 3D grating according to claim 1 located at an emitting side of the display panel.

15. The display device according to claim 14, wherein the display panel is a liquid crystal display panel, an organic light emitting display panel, a plasma display panel or a cathode-ray tube display.

16. The touch naked-eye 3D grating according to claim 1, wherein:
the adjacent one first touch sense line is configured for determining a first coordinate of a touch point in a first axis; and
the adjacent one second touch sense line is configured for determining a second coordinate of the touch point in a second axis.

17. A touch naked-eye 3D grating, comprising an upper substrate, a lower substrate located oppositely to the upper substrate, strip electrodes arranged at a side of the lower substrate facing the upper substrate, and a plate electrode arranged at a side of the upper substrate facing the lower substrate; and
a touch electrode structure located between the upper substrate and the plate electrode, the touch electrode structure and the plate electrode being insulated from each other, wherein:
the touch electrode structure comprises a plurality of first touch sense lines, a plurality of second touch sense lines, and a touch electrode arranged within an area defined between adjacent two first touch sense lines and adjacent two second touch sense lines;
the plurality of first touch sense lines is arranged to extend across the plurality of second touch sense lines and is insulated from the plurality of second touch sense lines; and
for each of the touch electrodes:
the touch electrode is directly and electrically connected to a corresponding adjacent first touch sense line to produce and output a first signal change on the corresponding adjacent first touch sense line when a quantity of electric charges of the touch electrode varies;
the touch electrode is also directly and electrically connected to a corresponding adjacent second touch sense line to produce and output a second signal change on the corresponding adjacent second touch sense line when the quantity of electric charges of the touch electrode varies; and
the first signal change outputted on the corresponding adjacent first touch sense line and the second signal change outputted on the corresponding adjacent second touch sense line are caused by variation of the quantity of electric charges of the same touch electrode.

18. A touch naked-eye 3D grating, comprising an upper substrate, a lower substrate located oppositely to the upper substrate, strip electrodes arranged at a side of the lower substrate facing the upper substrate, and a plate electrode arranged at a side of the upper substrate facing the lower substrate; and
a touch electrode structure located between the upper substrate and the plate electrode, the touch electrode structure and the plate electrode being insulated from each other, wherein:
the touch electrode structure comprises a plurality of first touch sense lines, a plurality of second touch sense lines, and a touch electrode arranged within an area defined between adjacent two first touch sense lines and adjacent two second touch sense lines; and the plurality of first touch sense lines is arranged to extend across the plurality of second touch sense lines and is insulated from the plurality of second touch sense lines;

for each of the touch electrodes:

the touch electrode is electrically connected to a corresponding adjacent first touch sense line directly to produce and output a first signal change on the corresponding adjacent first touch sense line when a quantity of electric charges of the touch electrode varies;

the touch electrode is electrically connected to a corresponding adjacent second touch sense line via a conductive wire to produce and output a second signal change on the corresponding adjacent second touch sense line when the quantity of electric charges of the touch electrode varies; and the first signal change outputted on the corresponding adjacent first touch sense line and the second signal change outputted on the corresponding adjacent second touch sense line are caused by variation of the quantity of electric charges of the same touch electrode.

* * * * *